US012044490B1

(12) United States Patent
Bullard

(10) Patent No.: US 12,044,490 B1
(45) Date of Patent: Jul. 23, 2024

(54) FIREARM TRACKING DEVICE AND SYSTEM

(71) Applicant: Wallace Bullard, Memphis, TN (US)

(72) Inventor: Wallace Bullard, Memphis, TN (US)

( * ) Notice: Subject to any disclaimer, the term of this patent is extended or adjusted under 35 U.S.C. 154(b) by 160 days.

(21) Appl. No.: 17/857,449

(22) Filed: Jul. 5, 2022

(51) Int. Cl.
*F41A 17/06* (2006.01)
*G01S 19/13* (2010.01)
*H04B 1/40* (2015.01)

(52) U.S. Cl.
CPC ............ *F41A 17/063* (2013.01); *G01S 19/13* (2013.01); *H04B 1/40* (2013.01)

(58) Field of Classification Search
CPC ........ F41A 17/063; F41A 17/06; F41A 35/00; G01S 19/00; G01S 19/13; G01S 19/14
See application file for complete search history.

(56) References Cited

U.S. PATENT DOCUMENTS

| | | | |
|---|---|---|---|
| D678,454 S | 3/2013 | Emde | |
| 8,726,556 B1* | 5/2014 | Willingham | F41A 17/063 42/70.11 |
| 8,947,252 B2 | 2/2015 | Wilson | |
| 9,546,835 B2* | 1/2017 | Efremkina | G01S 19/14 |
| 10,378,848 B1* | 8/2019 | Galie | F41A 19/16 |
| 10,580,271 B1* | 3/2020 | Sanders | F41A 17/063 |
| 11,156,419 B1* | 10/2021 | Wang | F41C 33/002 |
| 2011/0309975 A1* | 12/2011 | Chu | G01S 5/0027 342/357.52 |
| 2012/0062388 A1* | 3/2012 | Wilson | G01S 5/06 705/317 |
| 2014/0203913 A1* | 7/2014 | Danzy | F41A 17/063 42/1.01 |
| 2014/0259841 A1* | 9/2014 | Carlson | F41A 17/08 42/70.11 |
| 2014/0290109 A1* | 10/2014 | Stewart | E05B 45/005 42/70.01 |
| 2014/0290110 A1* | 10/2014 | Stewart | F41A 17/46 42/70.11 |
| 2015/0369554 A1* | 12/2015 | Kramer | H04N 9/806 386/227 |
| 2016/0116241 A1* | 4/2016 | Efremkina | G08B 21/0261 42/1.01 |
| 2017/0010062 A1* | 1/2017 | Black | F41J 5/10 |
| 2017/0077741 A1* | 3/2017 | Winiecki | F41A 17/46 |
| 2017/0160041 A1* | 6/2017 | Stewart | F41C 23/22 |
| 2018/0031345 A1* | 2/2018 | Winiecki | F41A 17/46 |
| 2018/0238649 A1* | 8/2018 | Winiecki | H02J 7/00 |
| 2018/0364000 A1* | 12/2018 | Sims | G01S 19/34 |

(Continued)

FOREIGN PATENT DOCUMENTS

WO 2018140835 8/2018

*Primary Examiner* — Joshua E Freeman
(74) *Attorney, Agent, or Firm* — Kyle A. Fletcher, Esq.

(57) ABSTRACT

The firearm tracking device and system comprises a firearm and a location tracker. The firearm may be operable to fire one or more rounds of ammunition through a barrel each time that the firearm is discharged by pulling a trigger. The location tracker may determine a location of the firearm. The location tracker may be operable to report the location to a remote computer system. In some embodiments, the location tracker may be operable to store a history file documenting movements of the firearm. In some embodiments, the location tracker may be activated by discharging the firearm.

16 Claims, 2 Drawing Sheets

(56) References Cited

U.S. PATENT DOCUMENTS

| | | | |
|---|---|---|---|
| 2019/0003804 A1* | 1/2019 | Deng | F41A 35/00 |
| 2019/0281259 A1* | 9/2019 | Palazzolo | H04N 7/183 |
| 2020/0003511 A1* | 1/2020 | Deng | F41A 17/06 |
| 2020/0003512 A1* | 1/2020 | Deng | F41A 17/06 |
| 2020/0011629 A1* | 1/2020 | Deng | G01S 19/18 |
| 2020/0109905 A1* | 4/2020 | Black | G08B 13/2448 |
| 2020/0232737 A1* | 7/2020 | McClellan | F41G 3/06 |
| 2020/0355457 A1* | 11/2020 | Deng | G01S 5/0009 |
| 2021/0389080 A1* | 12/2021 | McMillan | F41C 33/029 |
| 2022/0042756 A1* | 2/2022 | Biran | F41A 17/063 |
| 2022/0074690 A1* | 3/2022 | Lloyd | H04W 4/38 |
| 2022/0113102 A1* | 4/2022 | Mogaka | H04W 4/33 |
| 2023/0005350 A1* | 1/2023 | Weaver | G01S 5/22 |

\* cited by examiner

FIREARM TRACKING DEVICE AND SYSTEM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the fields of firearms and tracking systems, more specifically, a firearm tracking device and system.

SUMMARY OF INVENTION

The firearm tracking device and system comprises a firearm and a location tracker. The firearm may be operable to fire one or more rounds of ammunition through a barrel each time that the firearm is discharged by pulling a trigger. The location tracker may determine a location of the firearm. The location tracker may be operable to report the location to a remote computer system. In some embodiments, the location tracker may be operable to store a history file documenting movements of the firearm. In some embodiments, the location tracker may be activated by discharging the firearm.

An object of the invention is to provide a firearm for firing ammunition through a barrel when a trigger is pulled.

Another object of the invention is to provide a tracking system that determines the location of the firearm and stores the location within a memory card.

A further object of the invention is to provide a tracking system that communicates the location to a remote computer system via a cell phone network.

Yet another object of the invention is to provide a tracking system that is activated when the firearm is discharged.

These together with additional objects, features and advantages of the firearm tracking device and system will be readily apparent to those of ordinary skill in the art upon reading the following detailed description of the presently preferred, but nonetheless illustrative, embodiments when taken in conjunction with the accompanying drawings.

In this respect, before explaining the current embodiments of the firearm tracking device and system in detail, it is to be understood that the firearm tracking device and system is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the firearm tracking device and system.

It is therefore important that the claims be regarded as including such equivalent construction insofar as they do not depart from the spirit and scope of the firearm tracking device and system. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
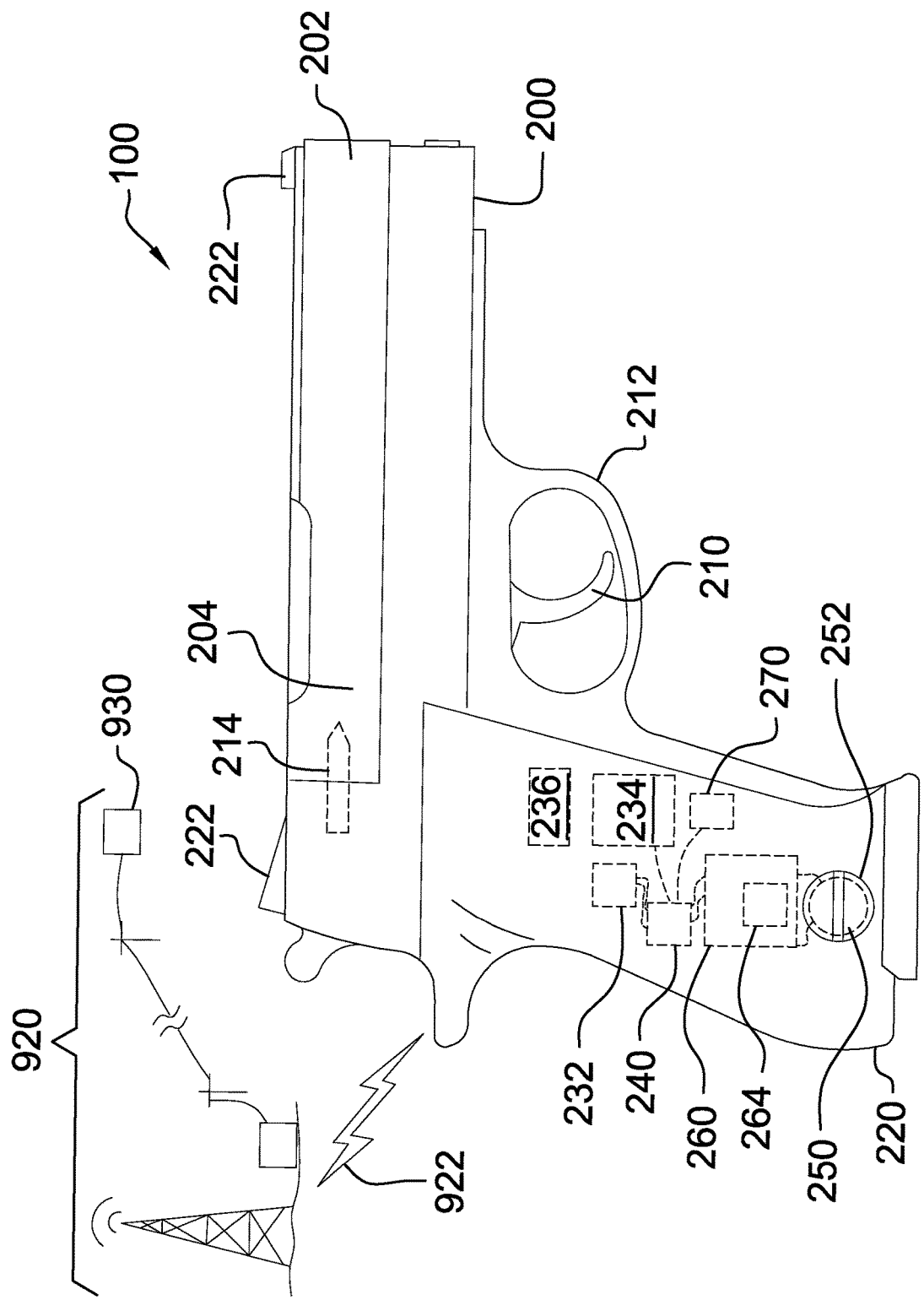
FIG. 1 is a side view of an embodiment of the disclosure.
Figure 2:
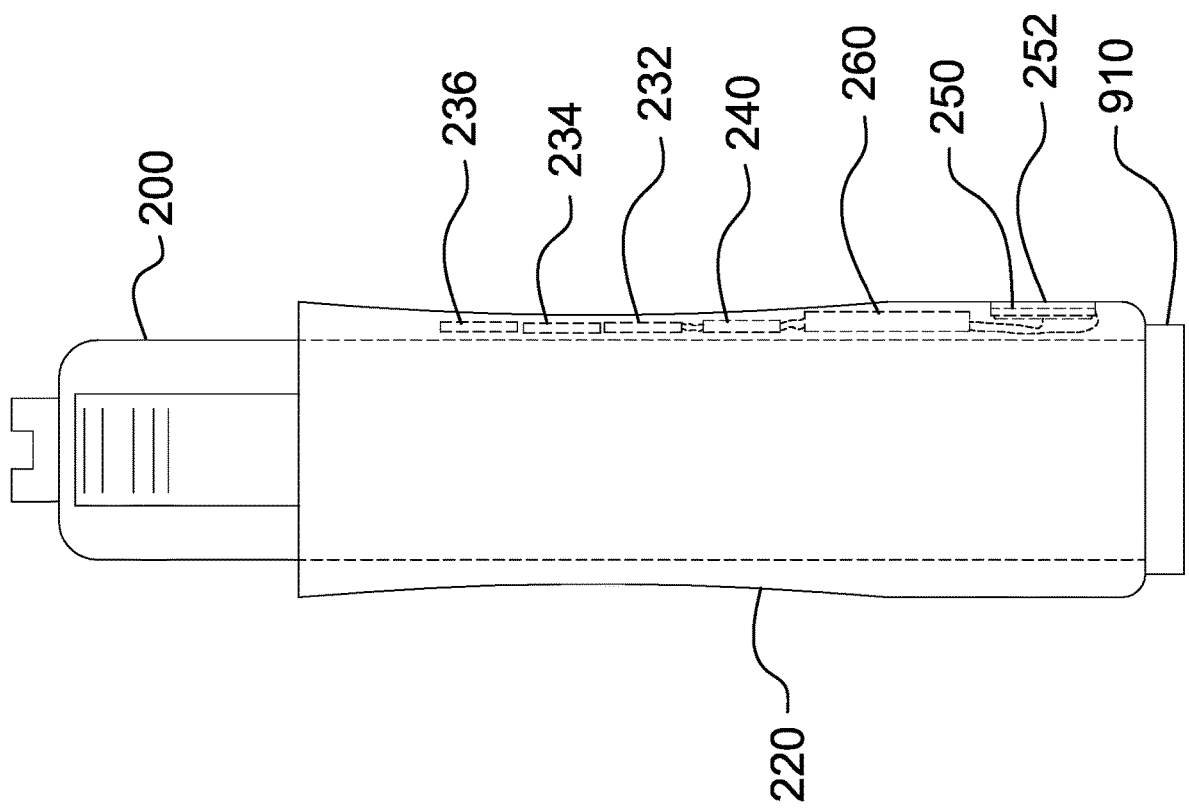
FIG. 2 is a rear view of an embodiment of the disclosure.

Detailed reference will now be made to a first potential embodiment of the disclosure, which is illustrated in FIGS. 1 through 2.

The firearm tracking device and system 100 (hereinafter invention) comprises a firearm 200 and a location tracker. The firearm 200 may be operable to fire one or more rounds of ammunition through a barrel 202 each time that the firearm 200 is discharged by pulling a trigger 210. The location tracker may determine a location of the firearm 200. The location tracker may be operable to report the location to a remote computer system 930. In some embodiments, the location tracker may be operable to store a history file 264 documenting movements of the firearm 200. In some embodiments, the location tracker may be activated by discharging the firearm 200.

The firearm 200 may be a weapon that may fire individual rounds of ammunition for purposes of recreation, hunting, or self-defense. The firearm 200 may comprise at least the barrel 202, a chamber 204, the trigger 210, a firing pin 214, and a grip 220. The barrel 202 may be a tube comprising a cylindrical internal bore. The barrel 202 may guide the individual round of ammunition as the individual round of ammunition exits from the firearm 200. The chamber 204 may be a cavity for holding the individual round of ammunition. The chamber 204 may be located at the rear of the barrel 202. The chamber 204 may be aligned with and/or integral to the barrel 202. The trigger 210 may be a mechanism for discharging the firearm 200. The trigger 210 may be pulled rearwards to initiate forward movement of the firing pin 214. The trigger 210 may be protected by a trigger guard 212 to prevent an unintentional discharge of the firearm 200. The firing pin 214 may be operable to impact the rear of the individual round of ammunition when the individual round of ammunition is within the chamber 204. The firing pin 214 may move forward when actuated by the trigger 210.

In some embodiments, a safety may prevent operation of the trigger 210 and/or the firing pin 214. The firearm 200 may further comprise sights 222 located on the top of the barrel 202. The sights 222 may be adapted for a user to aim the firearm by visually aligning the sights 222 with a target.

The grip 220 may be located rearward of the trigger 210 and may be adapted to be grasped by the user. In some embodiments, the grip 220 may comprise a magazine well where a clip 910 containing the one or more rounds of ammunition may be coupled to the firearm 200.

The location tracker may comprise a GPS circuit 232, a cell phone circuit 234, and a microprocessor 240. The location tracker may be operable to determine the location of the firearm and to convey the location to the remote computer system 930 via the cell phone circuit 234.

The GPS circuit 232 may be operable to calculate the location of the GPS circuit 232 based upon the timing of signals received from multiple orbiting satellites. The location calculated by the GPS circuit 232 may comprise at least a latitude coordinate and a longitude coordinate. The cell phone circuit 234 may comprise a transceiver that may be operable to communicate as an end node in a cell phone network 920 over a wireless communication link 922. The cell phone circuit 234 may be operable to pass data messages that comprise the location of the firearm 200. The cell phone circuit 234 may comprise a SIM card 236 that may uniquely identify the cell phone circuit 234 within the cell phone network 920.

The microprocessor 240 may be a computer processor that incorporates the functions of a central processing unit in the 13 form of one or more integrated circuits. The microprocessor 240 may be a multipurpose, clock driven, register based, digital-integrated circuit. The microprocessor 240 may accept binary data as input, may process the binary data according to instructions stored in an internal memory, and may provide results as output. The microprocessor 240 may contain both combinational logic and sequential digital logic. The microprocessor 240 may operate on numbers and symbols represented in the binary number system. The microprocessor 240 may control the sequencing and timing of the GPS circuit 232 and the cell phone circuit 234.

The location tracker may be powered by one or more batteries 250. The one or more batteries 250 may comprise one or more energy-storage devices. The one or more batteries 250 may be a source of electrical energy to operate the GPS circuit 232, the cell phone circuit 234, and the microprocessor 240. The one or more batteries 250 may be rechargeable and/or replaceable. As a non-limiting example, the one or more batteries 250 may be housed within the grip 220 of the firearm 200 and may be accessible for replacement via a battery access cover 252.

In some embodiments, the location tracker may comprise a memory card 260. The memory card 260 may be operable to store the history file 264 documenting movements of the firearm 200. As a non-limiting example, the memory card 260 may comprise a micro SD card.

In some embodiments, the location tracker may determine when the firearm 200 is discharged. The microprocessor 240 may 19 include discharge status along with the location in any information sent to the remote computer system 930 or stored in the history file 264. The location tracker may comprise a discharge sensor 270 for the purpose of detecting when the firearm 200 is discharged.

In some embodiments, the discharge sensor 270 may comprise a trigger sensor. The trigger sensor may be coupled to the trigger 210 and may detect that the trigger 210 has been pulled 4 to discharge the firearm 200.

In some embodiments, the discharge sensor 270 may comprise an acceleration sensor. The acceleration sensor may detect 8 acceleration of the firearm 200 caused by a discharge of the 9 firearm 200.

In some embodiments, the discharge sensor 270 may comprise a sound sensor. The sound sensor may detect sound volume that exceeds a predetermined sound threshold, indicative of the discharge of the firearm 200.

The microprocessor 240 may exchange information regarding the location, discharges of the firearm 200, the history file 264, or any combination thereof with the remote computer system 930. In some embodiments, the remote computer system 930 may call the cell phone circuit 234 within the firearm 200 and may request an information exchange comprising the location. In some embodiments, the cell phone circuit 234 may call the remote computer system 930 and may report the location.

In use, the clip 910 may be loaded with the individual rounds of ammunition and inserted into the magazine well. The GPS circuit 232 may acquire tracking information from multiple GPS satellites and may report the location of the firearm 200 to the microprocessor 240. The microprocessor 240 may record the location within the memory card 260 as a history file 264, may periodically dial out to the remote computer system 930 using the cell phone circuit 234 to report the location, or both. Alternatively, the remote computer system 930 may dial in to the cell phone circuit 234 and request the location from the microprocessor 240. Whenever the microprocessor 240 and the remote computer system 930 communicate, the microprocessor 240 may transmit the current location, the history file 264, or both. In some embodiments, the microprocessor 240 may determine when the firearm 200 is discharged using the discharge sensor 270. The discharge status may comprise times and locations of the discharges. The discharge status may be included in the history file 264, may be transmitted to the remote computer system 930, or both.

Definitions

Unless otherwise stated, the words "up", "down", "top", "bottom", "upper", and "lower" should be interpreted within a gravitational framework. "Down" is the direction that gravity would pull an object. "Up" is the opposite of "down". "Bottom" is the part of an object that is down farther than any other part of the object. "Top" is the part of an object that is up farther than any other part of the object. "Upper" may refer to top and "lower" may refer to the bottom. As a non-limiting example, the upper end of a vertical shaft is the top end of the vertical shaft.

As used herein, "barrel" may refer to the straight shooting tube or a firearm. Barrels are typically made of high-strength metal in order to contain the high-pressure of rapidly expanding gases used to propel a projectile out of the front of the barrel. The hollow interior of the barrel may be referred to as the bore. The diameter of the bore may be referred to as the caliber.

Throughout this document the terms "battery", "battery pack", and "batteries" may be used interchangeably to refer to one or more wet or dry cells or batteries of cells in which chemical energy is converted into electricity and used as a source of DC power. References to recharging or replacing batteries may refer to recharging or replacing individual cells, individual batteries of cells, or a package of multiple battery cells as is appropriate for any given battery technology that may be used. The battery may require electrical contacts which may not be illustrated in the figures.

As used herein, "cellular network" or "cell phone network" may refer to a communication network where the link to and from end nodes is wireless. The network may be distributed over land areas called cells, each served by at least one fixed-location transceiver. As non-limiting examples, the wireless protocols used to communicate with end nodes may comprise CDMA, GSM, and LTE.

As used herein, "chamber" may refer to the cavity at the back end of a firearm barrel where ammunition may be inserted in preparation for firing. In some firearms, the chamber may be integral to the barrel.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used in this disclosure, a "firearm" may be a handheld weapon designed to expel a projectile which has been accelerated using a mechanism comprising an explosion.

As used in this disclosure, a "firing pin" may be a mechanical device that initiates the explosion required within a firearm to expel the projectile.

As used herein, "front" may indicate the side of an object that is closest to a forward direction of travel under normal use of the object or the side or part of an object that normally presents itself to view or that is normally used first. "Rear" or "back" may refer to the side that is opposite the front.

As used herein, "GPS" may refer to a device that uses signals received from a system of navigational satellites to determine the position of the device. GPS is an acronym for Global Positioning System.

As used herein, "magazine" may refer to a device for storing and feeding ammunition into a firearm. In some firearms, the magazine may be detachable. A detachable magazine may be referred to as a clip.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "sensor" may be a device that quantitatively measures a physical stimulus.

As used in this disclosure, a "transceiver" may be a device that is used to transmit and/or receive signals. The signals may be audible, optical, or RF in nature.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 2, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A firearm tracking device and system comprising:
a firearm and a location tracker;
wherein the firearm is operable to fire one or more rounds of ammunition through a barrel each time that the firearm is discharged by pulling a trigger;
wherein the location tracker determines a location of the firearm;
wherein the location tracker is operable to report the location to a remote computer system;
wherein the location tracker comprises a GPS circuit, a cell phone circuit, and a microprocessor;
wherein the location tracker is operable to determine the location of the firearm and to convey the location to the remote computer system via the cell phone circuit;
wherein the location tracker determines when the firearm is discharged;
wherein the microprocessor includes discharge status along with the location in any information sent to the remote computer system or stored in the history file;
wherein the remote computer system calls the cell phone circuit within the firearm and requests an information exchange comprising the location;
wherein the cell phone circuit calls the remote computer system and reports the location.

2. The firearm tracking device and system according to claim 1
wherein the firearm is a weapon that fires individual rounds of ammunition for purposes of recreation, hunting, or self-defense;
wherein the firearm comprises at least the barrel, a chamber, the trigger, a firing pin, and a grip;
wherein the barrel is a tube comprising a cylindrical internal bore;
wherein the barrel guides the individual round of ammunition as the individual round of ammunition exits from the firearm;
wherein the chamber is a cavity for holding the individual round of ammunition;
wherein the chamber is located at the rear of the barrel;
wherein the chamber is aligned with and/or integral to the barrel;
wherein the trigger is a mechanism for discharging the firearm;
wherein the trigger is pulled rearwards to initiate forward movement of the firing pin.

3. The firearm tracking device and system according to claim 2
wherein the trigger is protected by a trigger guard to prevent an unintentional discharge of the firearm;
wherein the firing pin is operable to impact the rear of the individual round of ammunition when the individual round of ammunition is within the chamber;
wherein the firing pin moves forward when actuated by the trigger.

4. The firearm tracking device and system according to claim 3
wherein the firearm further comprises sights located on the top of the barrel;
wherein the sights are adapted for a user to aim the firearm by visually aligning the sights with a target.

5. The firearm tracking device and system according to claim 4
wherein the grip is located rearward of the trigger and is adapted to be grasped by the user.

6. The firearm tracking device and system according to claim 5
wherein the grip comprises a magazine well where a clip containing the one or more rounds of ammunition is coupled to the firearm.

7. The firearm tracking device and system according to claim 5
wherein the GPS circuit is operable to calculate the location of the GPS circuit based upon the timing of signals received from multiple orbiting satellites;
wherein the location calculated by the GPS circuit comprises at least a latitude coordinate and a longitude coordinate;
wherein the cell phone circuit comprises a transceiver that is operable to communicate as an end node in a cell phone network over a wireless communication link;
wherein the cell phone circuit is operable to pass data messages that comprise the location of the firearm.

8. The firearm tracking device and system according to claim 7
wherein the cell phone circuit comprises a SIM card that uniquely identifies the cell phone circuit within the cell phone network.

9. The firearm tracking device and system according to claim 8
wherein the microprocessor is a computer processor that incorporates the functions of a central processing unit in the form of one or more integrated circuits;
wherein the microprocessor is a multipurpose, clock driven, register based, digital-integrated circuit;
wherein the microprocessor accepts binary data as input, processes the binary data according to instructions stored in an internal memory, and provides results as output;
wherein the microprocessor contains both combinational logic and sequential digital logic;
wherein the microprocessor operates on numbers and symbols represented in the binary number system;
wherein the microprocessor controls the sequencing and timing of the GPS circuit and the cell phone circuit.

10. The firearm tracking device and system according to claim 9
wherein the location tracker is powered by one or more batteries;
wherein the one or more batteries comprise one or more energy-storage devices;
wherein the one or more batteries are a source of electrical energy to operate the GPS circuit, the cell phone circuit, and the microprocessor;
wherein the one or more batteries are rechargeable and/or replaceable.

11. The firearm tracking device and system according to claim 10
wherein the location tracker comprises a memory card;
wherein the memory card is operable to store a history file documenting movements of the firearm.

12. The firearm tracking device and system according to claim 11
wherein the memory card comprises a micro SD card.

13. The firearm tracking device and system according to claim 11
wherein the location tracker comprises a discharge sensor for the purpose of detecting when the firearm is discharged.

14. The firearm tracking device and system according to claim 13
wherein the discharge sensor comprises a trigger sensor;
wherein the trigger sensor is coupled to the trigger and detects that the trigger has been pulled to discharge the firearm.

15. The firearm tracking device and system according to claim 13
wherein the discharge sensor comprises an acceleration sensor;
wherein the acceleration sensor detects acceleration of the firearm caused by a discharge of the firearm.

16. The firearm tracking device and system according to claim 13
wherein the discharge sensor comprises a sound sensor;
wherein the sound sensor detects sound volume that exceeds a predetermined sound threshold, indicative of the discharge of the firearm.

* * * * *